United States Patent
Lee et al.

(10) Patent No.: US 9,377,629 B2
(45) Date of Patent: Jun. 28, 2016

(54) LENTICULAR UNIT FOR TWO-DIMENSIONAL/THREE-DIMENSIONAL AUTO-STEREOSCOPIC DISPLAY

(75) Inventors: Yong-Su Lee, Hwaseong-si (KR); Yoon-Ho Khang, Yongin-si (KR); Se-Hwan Yu, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 367 days.

(21) Appl. No.: 13/434,487

(22) Filed: Mar. 29, 2012

(65) Prior Publication Data

US 2012/0250151 A1 Oct. 4, 2012

(30) Foreign Application Priority Data

Mar. 31, 2011 (KR) .................. 10-2011-0029930

(51) Int. Cl.
*G02B 27/22* (2006.01)
*H04N 13/04* (2006.01)

(52) U.S. Cl.
CPC ........ *G02B 27/2214* (2013.01); *H04N 13/0404* (2013.01); *H04N 13/0452* (2013.01)

(58) Field of Classification Search
CPC ........ G02B 3/00; G02B 7/02; G02B 13/0045; G02B 15/14; G02B 7/102; G02B 2003/0093
USPC ........................................ 359/463
See application file for complete search history.

(56) References Cited

U.S. PATENT DOCUMENTS

| | | | |
|---|---|---|---|
| 6,064,424 A | 5/2000 | van Berkel et al. | |
| 6,930,817 B2 * | 8/2005 | Srinivasan et al. | 359/295 |
| 7,187,344 B2 * | 3/2007 | Feenstra et al. | 345/6 |
| 7,307,672 B2 | 12/2007 | Feenstra et al. | |
| 7,944,617 B2 | 5/2011 | Ishioka et al. | |
| 7,988,941 B2 | 8/2011 | Choi et al. | |
| 2011/0089404 A1 * | 4/2011 | Marcus et al. | 257/29 |
| 2011/0096071 A1 * | 4/2011 | Okamoto et al. | 345/419 |
| 2011/0311722 A1 * | 12/2011 | Faris | 427/203 |

FOREIGN PATENT DOCUMENTS

| | | |
|---|---|---|
| CN | 10-1482627 | 7/2009 |
| JP | S56-16121 | 2/1981 |

(Continued)

OTHER PUBLICATIONS

Bae et al., Roll-to-Roll Production of 30-Inch Graphene Films for Transparent Electrodes, Jun. 20, 2010, Nature Nanotechnology, vol. 5, pp. 574-578.*

(Continued)

*Primary Examiner* — Jade R Chwasz
(74) *Attorney, Agent, or Firm* — H.C. Park & Associates, PLC

(57) ABSTRACT

A lenticular unit includes a transparent substrate; first electrodes being transparent and disposed on the substrate; a second electrode being transparent and elastic; and a transparent material layer interposed between the first and second electrodes and being deformable in a lens shape in a thickness direction depending on a potential applied between the first and second electrodes.

18 Claims, 9 Drawing Sheets

(56) References Cited

FOREIGN PATENT DOCUMENTS

| | | |
|---|---|---|
| JP | 2004-326114 | 11/2004 |
| JP | 2005-506778 | 3/2005 |
| JP | 2005-517991 | 6/2005 |
| JP | 2008-083073 | 4/2008 |
| JP | 2009-107921 | 5/2009 |
| JP | 2010-176019 | 8/2010 |
| JP | 2010-244057 | 10/2010 |
| JP | 2011-095369 | 5/2011 |
| WO | 2006-108188 | 10/2006 |

OTHER PUBLICATIONS

Kim et al., "Low-temperature synthesis of large-area graphene-based transparent conductive films using surface wave plasma chemical vapor deposition," Applied Physics Letters 98, 091502, Mar. 2, 2011, pp. 1-3, Nanotube Research Center, National Institute of Advanced Industrial Science and Technology.

Notification of Reason for Rejection issued on Oct. 6, 2015, in Japanese Patent Application No. 2012-073013.

First Chinese Office Action issued on Jun. 2, 2015, in Chinese Patent Application No. 201210101407.4.

* cited by examiner

LENTICULAR UNIT FOR TWO-DIMENSIONAL/THREE-DIMENSIONAL AUTO-STEREOSCOPIC DISPLAY

CROSS-REFERENCE TO RELATED APPLICATION

This application claims priority from and the benefit of Korean Patent Application No. 10-2011-0029930, filed on Mar. 31, 2011, which is hereby incorporated by reference for all purposes as if fully set forth herein.

BACKGROUND

1. Field

Exemplary embodiments of the present invention relate generally to a lenticular unit for realizing three-dimensional auto-stereoscopic display.

2. Discussion of the Background

Three-dimensional (3D) effects of an object may be achieved by binocular disparity when a viewer or an observer views the object through retinas of his or her left and right eyes simultaneously in different directions and then recognizes it by means of the brain. Therefore, to display 3D images, left and right eyes of a viewer are allowed to view different images using the principle of the binocular disparity, enabling the viewer to recognize the 3D images.

3D display technology may be roughly classified into stereoscopic display technology, which requires viewers to wear special glasses such as shutter glasses and polarized glasses, and auto-stereoscopic display technology, which does not require viewers to wear glasses.

An auto-stereoscopic display device may be generally classified into a parallax barrier 3D display device and a lenticular 3D display device. The parallax barrier 3D display device includes a vertical grid-shaped parallax barrier with openings or slits, mounted in front of a display screen or panel having pixels arranged in a matrix of rows and columns. The parallax barrier separates a right image and a left image associated with the right eye and the left eye of a viewer, respectively, causing binocular disparity between different images on the display panel, thereby enabling the viewer to recognize 3D images. Disadvantageously, however, the parallax barrier 3D display device may suffer from diffraction caused by the slits. On the other hand, the lenticular 3D display device uses a lenticular screen or a lenticular lens sheet with a column-wise array of semi-cylindrical lenses, instead of the vertical grid-shaped parallax barrier, to separate one image on a display screen or panel into a left-eye image and a right-eye image, allowing viewers to enjoy 3D images.

Recently, there is a growing demand for a 3D display device that is switchable between a 2D mode and a 3D mode. This type of display device may selectively display any one of a 2D image and a 3D image depending on an image signal provided from a display screen or panel. To meet this demand, several types of 2D/3D-switchable auto-stereoscopic display devices have been developed.

Referring to FIG. 1, a conventional auto-stereoscopic display device may include a backlight unit 14, a Liquid Crystal Display (LCD) panel 10, and a lenticular means 15, which can switch between a 2D mode and a 3D mode. The LCD panel 10 includes an array of pixels 12 arranged in rows and columns. The LCD panel 10 is scanned by light from the backlight unit 14. Light incident on the LCD panel 10 is changed by the individual pixels 12, depending on appropriate driving voltages applied thereto, to generate desired images.

The lenticular means 15 is disposed on the LCD panel 10. The lenticular means 15 includes a transparent lenticular sheet or lenticular lens sheet 30, on which multiple parallel cylindrical lenses 16 are arranged, a transparent flat-surfaced plate 36 facing the lenticular lens sheet 30, transparent electrodes 34 and 37, which are formed on inner sides of the lenticular lens sheet 30 and the flat-surfaced plate 36, respectively, and an electro-optical medium 38 in the space between the two transparent electrodes 34 and 37. The electro-optical medium 38 may include an appropriate liquid crystal material, i.e., may generally include nematic liquid crystal. The lenticular lens sheet 30 has one flat surface by being molded (or processed) from optically transparent polymer materials, and its screen is formed in a convex-ribbed shape defined by contours of lenses. In this structure, if there is no potential applied between the two electrodes 34 and 37, the lenticular means 15 may run the same as the lenticular lens sheet 30, so it separates one image on the LCD panel 10 into a left-eye image and a right-eye image for a viewer, allowing the viewer to enjoy 3D images. On the contrary, if an appropriate potential is applied between the two electrodes 34 and 37, a refractive index of the electro-optical medium 38 may be substantially identical to a refractive index of the lenticular lens sheet 30 in the viewing direction, removing the lens effects of the lenticular lenses 16. In this case, the lenticular means 15 may act as a permeable plate that merely passes 2D images from the LCD panel 10.

SUMMARY OF THE INVENTION

Exemplary embodiments of the present invention provide a lenticular unit or a lenticular lens sheet without the need for an array of lenses molded from polymer materials.

Exemplary embodiments of the present invention also provide a lenticular unit or a lenticular lens sheet to be used in a 2D/3D-switchable auto-stereoscopic display device, without the need not only for an array of lenses molded from polymer materials, but also without the need for an electro-optical medium requiring the adjustment of its refractive index.

Additional features of the invention will be set forth in the description which follows, and in part will be apparent from the description, or may be learned by practice of the invention.

In accordance with one aspect of the present invention, there is provided a lenticular unit. The lenticular unit includes a transparent substrate; first electrodes being transparent and disposed on the substrate; a second electrode being transparent and elastic; and a material layer interposed between the first and second electrodes and being deformable in a lens shape in response to an electric potential applied between the first and second electrodes.

In accordance with another aspect of the present invention, there is provided a two-dimensional (2D)/three-dimensional (3D)-switchable auto-stereoscopic display device. The 2D/3D-switchable auto-stereoscopic display device includes a display unit configured to provide an image; and a lenticular unit disposed in front of the display unit. The lenticular unit includes first electrodes being transparent and formed on a transparent substrate; a second electrode being transparent and elastic; and a material layer disposed between the first and second electrodes and being deformable in response to an electric potential between the first and second electrodes. In one of a 2D display mode and a 3D display mode, no potential is applied between the first and second electrodes so that the material layer of the lenticular unit may not be deformed. In the other of the 2D display mode and the 3D display mode, a potential is applied between the first and second electrodes so that the material layer of the lenticular unit is deformed.

In accordance with further another aspect of the present invention, there is provided a lenticular lens sheet including a transparent substrate; first electrodes being transparent and disposed on the transparent substrate; a second electrode being transparent and elastic; and a material layer disposed between the first and second electrodes and being deformable into an array of cylindrical lenses having convex-ribbed profiles in response to an electric potential between the first and second electrodes.

In accordance with yet another aspect of the present invention, there is provided a method of displaying an image using a display panel and a lenticular unit disposed in front of the display panel. The method includes, in a first display mode used to display one of a 2D image and a 3D image, not deforming a material layer of the lenticular unit through which the displayed image passes. In a second display mode used to display the other of the 2D image and the 3D image, the material layer of the lenticular unit through which the displayed image passes is deformed. Deforming the material layer of the lenticular unit includes either applying an electric potential across the material layer so as to deform a substantially flat surface of the material layer into an array of cylindrical lenses or applying an electric potential across the material layer so as to deform a surface of the material layer forming an array of cylindrical lenses into a substantially flat surface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF ILLUSTRATED EMBODIMENTS

Figure 1:
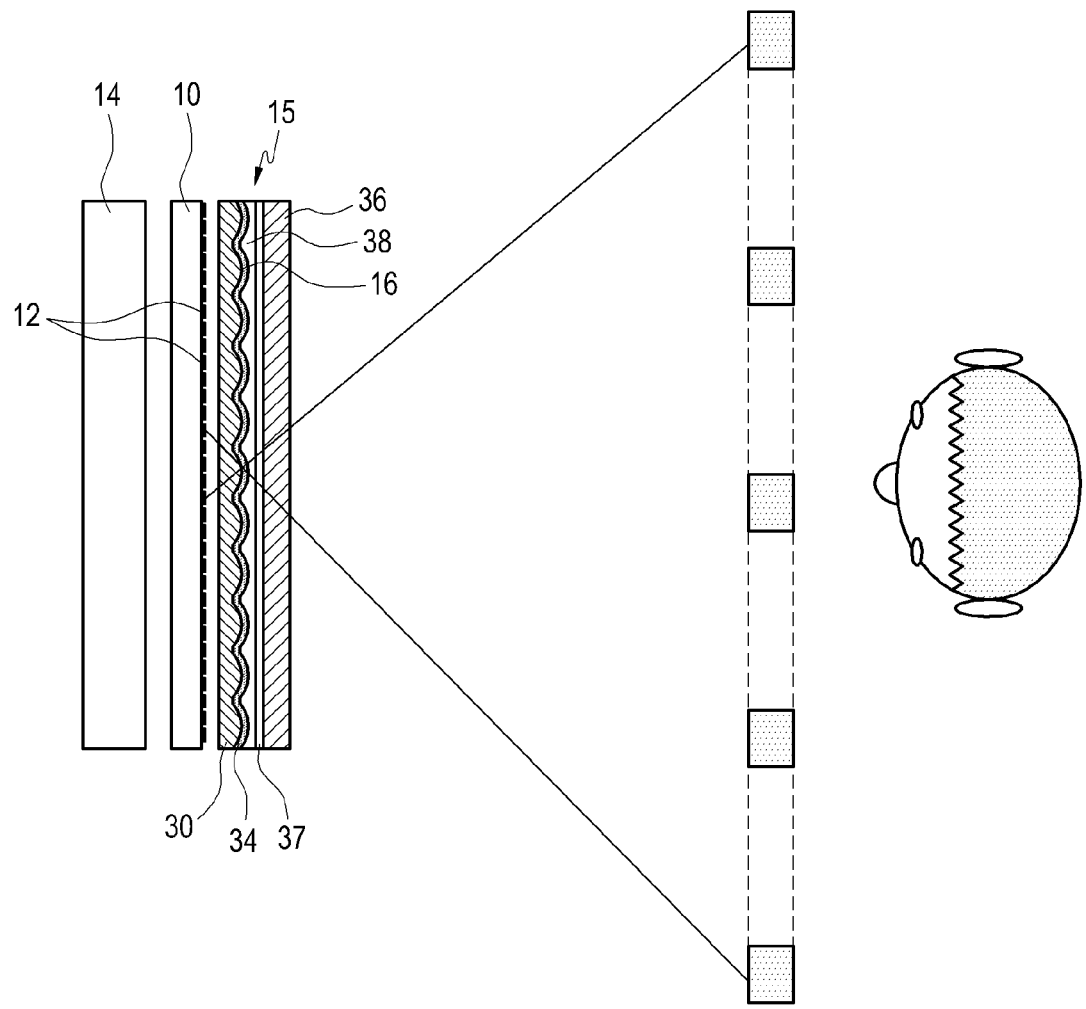
FIG. 1 is a diagram illustrating an auto-stereoscopic display device according to the prior art.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

It should be noted that a lenticular unit according to exemplary embodiments of the present invention may replace the conventional lenticular means 15 described above with reference to FIG. 1.

Figure 2:
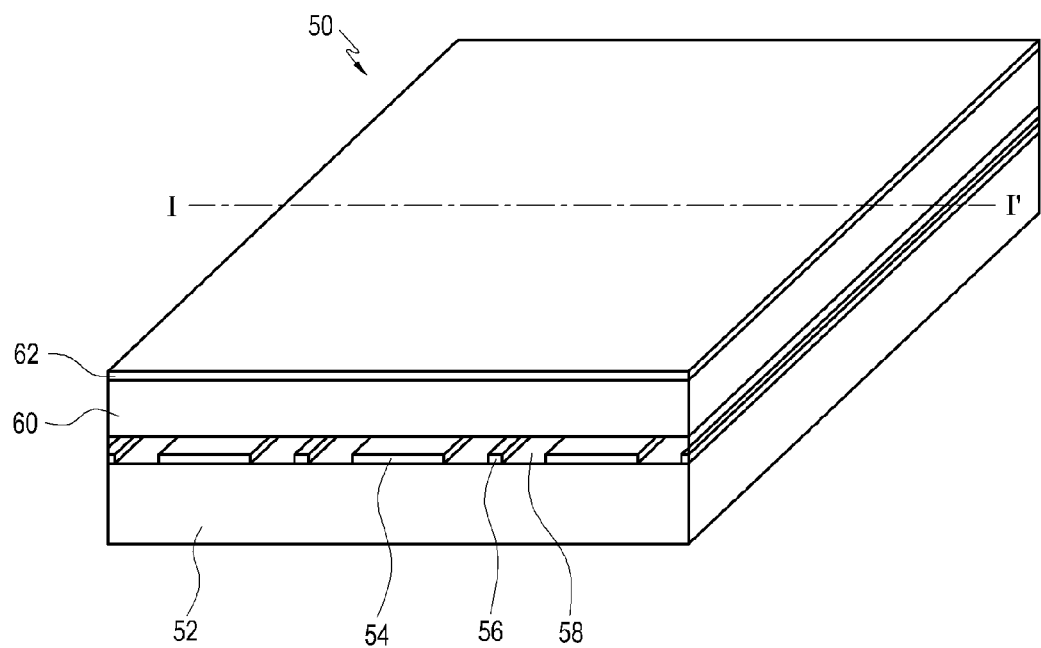
FIG. 2 is a partially enlarged perspective view of a lenticular unit, which is switchable from a 2D display mode to a 3D display mode in reply to an applied voltage, according to an exemplary embodiment of the present invention.

Referring to FIG. 2, a lenticular unit or a lenticular lens sheet 50 includes a transparent substrate 52. For example, the transparent substrate 52 may be made of glass or plastic, and it may have any suitable thickness, such as about 7 mm thick. Transparent electrodes 54 and 56 (i.e., first electrodes) are formed on the substrate 52. The transparent electrodes 54 and 56 may be made of a material such as Indium Zinc Oxide (IZO), Indium Tin Oxide (ITO), etc. The transparent electrodes 54 and 56 may have any suitable thickness, such as about 550 Å thick. The electrodes 54 and 56 may have stripe shapes, and they may extend in parallel to the column direction to define a lens period or pitch of lenses, as described below. An insulating layer 58, which may have any suitable thickness, such as about 500~600 Å, is formed on the electrodes 54 and 56 and the substrate 52. The insulating layer 58 may include an insulating material such as silicon oxide (SiOx) or silicon nitride (SiNx). A material layer 60, which can have a substantially flat surface that may be deformed into a lens shape in response to an applied electric potential or vice versa, is disposed on the insulating layer 58. The material layer 60 may include a material selected from field-activated electro-active polymers (field-activated EAPs). Such materials may be light, have a high piezoelectric coefficient, and have good flexibility and high strength properties as mechanical properties. For example, the EAPs may be polyvinylidene fluoride (PVDF, i.e., homopolymer of vinylidene fluoride), PVDF-trifluoroethylene (PVDF-TrFE, i.e., copolymer of PVDF), silicon, and polyurethane. A second electrode or a common electrode 62 is formed on the material layer 60. The second electrode 62 may include a transparent material of high strength, high flexibility or elasticity, and low-resistance. For example, the second electrode 62 may be made of a graphene layer.

Graphene is a name given to one layer of graphite carbon atoms densely filled in a benzene ring structure. One layer of carbon atoms may be about 1.3 Å thick. However, the term 'graphene' has also been used to describe a thin film (1 to 40 layers) of carbon atoms filled in the benzene ring structure in the general meaning.

A graphene layer constituting the second electrode 62 may have 1 to 5 layers. As the number of layers increase, resistance of the layers decreases. However, too many layers may result in loss of transparency. Thus, to avoid this loss in transparency, the second electrode 62 should not exceed 5 graphene layers.

Although not illustrated, the electrodes 56 may be connected together at their upper ends or lower ends, and the electrodes 54 may be connected together at the opposite ends of those of the electrodes 56.

The electrodes 54 and 56 may include graphene layers instead of IZO or ITO. In this case, their overall thickness may be reduced and their overall flexibility may be improved, because graphene layers may be thinner than the IZO or ITO.

A method for operating or using a lenticular unit depending on voltages applied between the first electrodes 54 and 56 and the second electrode or common electrode 62 will be described with reference to FIGS. 3 and 4.

Figure 3:
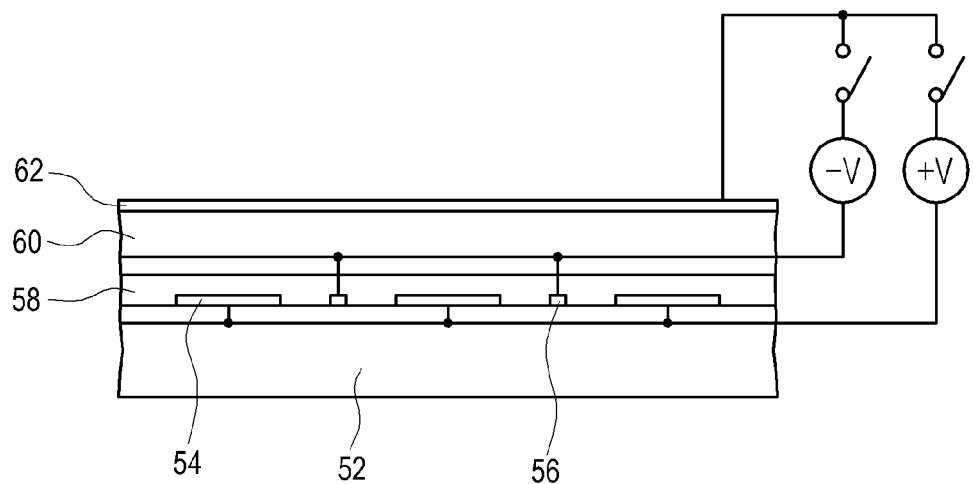
FIG. 3 is a cross-sectional view taken along the line I-I' of FIG. 2, illustrating an operation of a 2D auto-stereoscopic lenticular unit according to an exemplary embodiment of the present invention.

Referring to FIG. 3, in a 2D display mode, no voltages are applied between the first electrodes 54 and 56, and the second electrode 62. In this case, a 2D image from a display unit (not shown) may pass through the transparent substrate 52, first electrodes 54 and 56, insulating layer 58, material layer 60, and second electrode 62, allowing a viewer to watch the 2D image.

Figure 4:
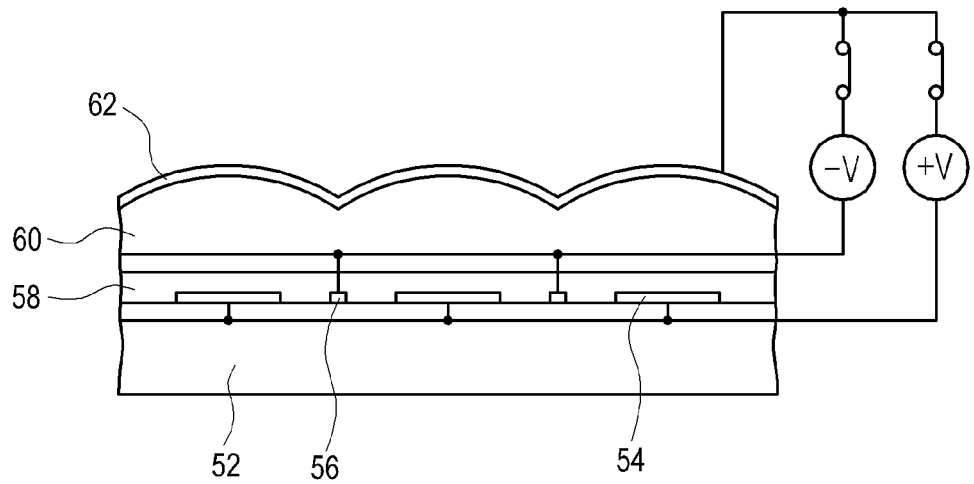
FIG. 4 is a cross-sectional view taken along the line I-I' of FIG. 2, illustrating an operation of a 3D auto-stereoscopic lenticular unit according to an exemplary embodiment of the present invention.
Figure 5:
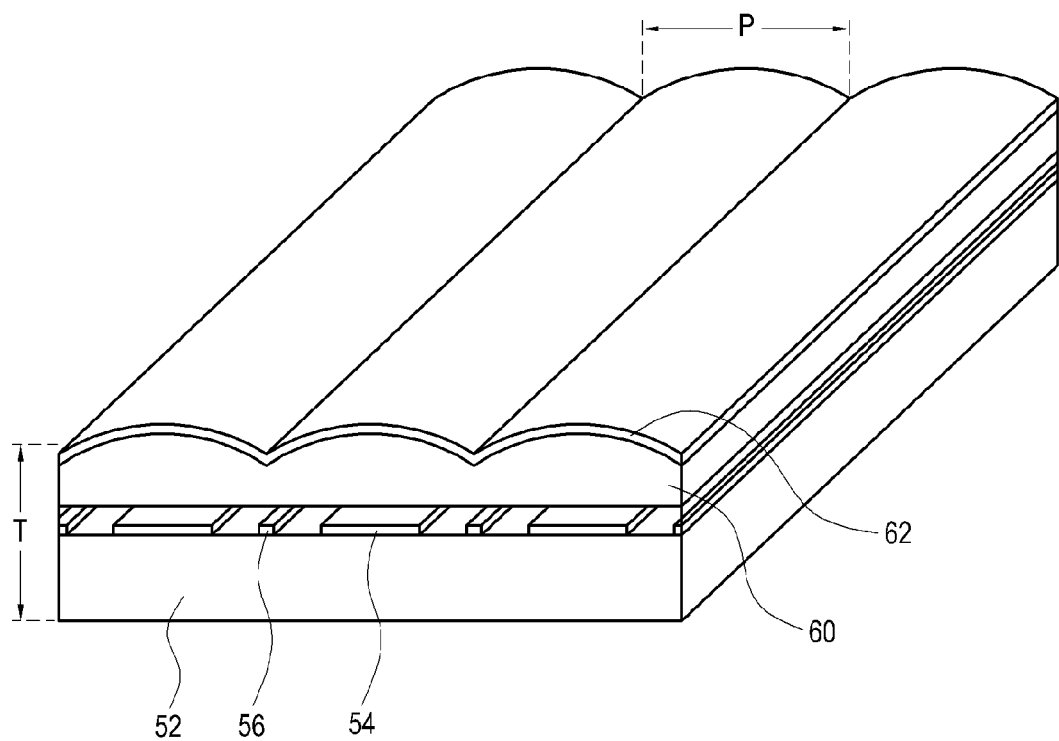
FIG. 5 is an enlarged perspective view illustrating an operation of the 3D auto-stereoscopic lenticular unit shown in FIG. 4.

Referring to FIG. 4, in a 3D display mode, a voltage +V may be applied to the electrodes 54 with respect to the second electrode 62, and a voltage −V may be applied to the electrodes 56 with respect to the second electrode 62. Then, due to the piezoelectric effects, the piezoelectric material on the electrodes 54 expands in the thickness direction and the piezoelectric material on the electrodes 56 contracts (or shrinks) in the thickness direction, causing the displacement. As a result, the front of the lenticular unit may be deformed into an array of parallel lenses having convex-ribbed profiles and extending longitudinally. Therefore, the array of lenses in the lenticular unit 50 may separate an image on a display unit into a left-eye image and a right-eye image for a viewer, allowing the viewer to watch 3D images. In other words, as illustrated in FIG. 5, the lenticular unit 50 may be deformed into a shape that is similar to that of a conventional lenticular lens sheet.

Lens characteristics illustrated in FIG. 5, including a focal distance F, a lens period (or pitch) P, and a laminate thickness T meaning the number of layers from pixels (or sub pixels in a color display) on the display unit up to lenses of the lenticular unit 50, may be defined by Equations (1) to (3) below.

$$F = \frac{VL}{M+1} \quad (1)$$

$$P = N \times PL \times \frac{M}{M+1} \quad (2)$$

$$T = r \times \frac{VL}{M} \quad (3)$$

where M represents a magnification, VL represents a visibility distance, N represents the number of views, PL represents a pixel period or pitch in the row or horizontal direction, and r represents a refractive index of the substrate 52. The magnification M='period or pitch of views'/'period or pitch of pixels in the horizontal direction'.

Therefore, once the number of and arrangements of views, the visibility distance indicating the distance from the central position of views to the surface of the lenticular unit, and the array of pixels of the display unit are determined, the lens characteristics may be determined using Equations (1) to (3), making it possible to design a lenticular unit. Each lens pitch may include as many row-wise pixels as the number of views.

A series of columns of convex-ribbed lenses of the lenticular unit 50 are arranged parallel to each other in the vertical or column direction. In an exemplary embodiment, the convex-ribbed lenses of the lenticular unit 50 may be arranged so that they are parallel with the columns of pixels of the underlying display unit. Alternatively, the convex-ribbed lenses of the lenticular unit 50 may be tilted against the columns of pixels on the display unit. A method for determining a tilt angle between the columns of lenses and the columns of pixels is disclosed in U.S. Pat. No. 6,064,424 issued to Cornelis van Berkel et al.

A method of manufacturing the lenticular unit 50 according to an exemplary embodiment of the present invention will be described with reference to FIGS. 6A to 6C.

Figure 6A:
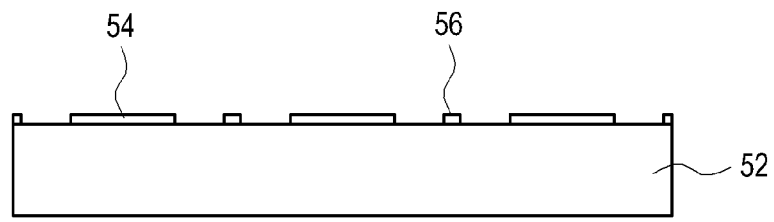
FIG. 6A, FIG. 6B, and FIG. 6C are diagrams illustrating a method of manufacturing a lenticular unit according to an exemplary embodiment of the present invention.

Referring to FIG. 6A, patterns of the transparent electrodes 54 and 56, which may be made of a transparent conductive material such as IZO, ITO, or graphene, are formed on the substrate 52, which may be made of a transparent material such as glass or plastic. It should be noted that gaps between the electrodes 56 provide lens pitches. Transparent electrodes of IZO or ITO may be formed using any suitable method, such as sputtering deposition and photolithography.

When the electrodes 54 and 56 are formed of graphene layers, a graphene film (1 to 5 layers) may be formed using any suitable method. For example, the graphene film may be deposited on the substrate 52 using a microwave plasma enhanced Chemical Vapor Deposition (CVD) process. Hydrocarbon precursor such as $CH_4$, $C_2H_2$ and $C_3H_8$, hydrogen ($H_2$) gas, and argon (Ar) gas may be used.

In order to obtain the thickness of the graphene film, $CH_4$ gas of about 300 Standard Cubic Centimeters per Minute (SCCM), $H_2$ gas of about 10 SCCM, and Ar gas of about 20 SCCM may be applied at a low temperature of about 300-400° C. for an appropriate time while the microwave power is appropriately adjusted. The graphene film may have a thickness of 1 to 5 layers, as described above.

After formation of the graphene film, an etching process may be performed to form the stripe-shaped electrodes 54 and 56. With this process, a photoresist layer is applied onto the graphene film. Standard lithography techniques, such as deep-UV photoresist, may be used to pattern the photoresist layer. The exposed portions of graphene film or layer may be etched by, for example, an $O_2$ reactive ion etching (RIE) process. The photoresist on the non-etched graphene film may then be removed by a strip solvent.

Figure 6B:
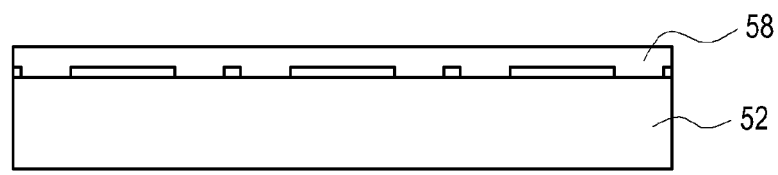

After patterning the electrodes 54 and 56, the insulating layer 58, which may be made of an insulating material such as SiOx or SiNx, may be deposited on the exposed substrate and the electrodes 54 and 56 by any suitable process, such as a CVD process, as illustrated in FIG. 6B.

Figure 6C:
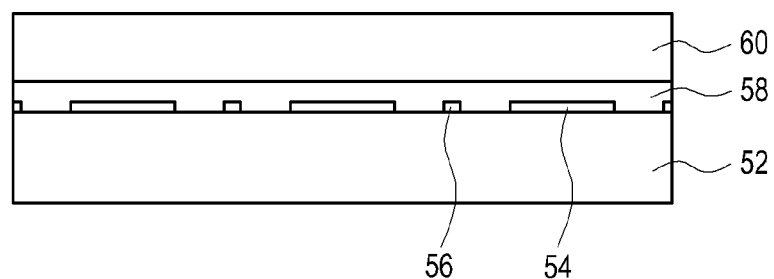

Referring to FIG. 6C, the piezoelectric material layer 60, which causes a displacement of its thickness depending on an electric field applied in the thickness direction, is formed on the insulating layer 58. In this exemplary embodiment, a material of the material layer 60 is PVDF. As for piezoelectric properties of PVDF, a piezoelectric coefficient in the thickness direction is $D_T$=13~22 μC/V and a relative permittivity is 10~12. As for mechanical properties of PVDF, an elastic coefficient in the thickness direction is 1600~2200 MPa. The material layer 60 may be formed using any suitable process. For example, the PVDF layer may be formed by attaching a PVDF piezoelectric film having the above properties, or by coating solution-phase PVDF on the entire surface of the insulating layer 58 through a slit nozzle and then hardening it by heat baking. The PVDF layer may be displaced in the thickness direction by an appropriate voltage or potential applied thereto. Therefore, if the thicknesses of the lenses are given, voltages to be applied to the PVDF layer may be determined.

After the PVDF layer is formed, a graphene layer or film constituting the common electrode or the second electrode 62 may be formed on the PVDF layer, as described above.

Figure 7:
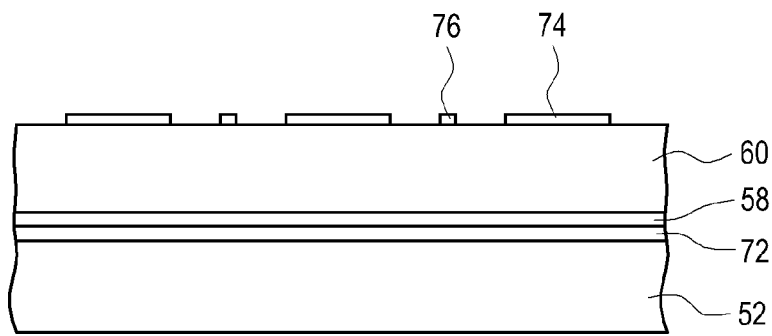
FIG. 7 is an enlarged cross-sectional view of a lenticular unit, which is switchable from a 2D display mode to a 3D display mode in reply to an applied voltage, according to another exemplary embodiment of the present invention.

Another exemplary embodiment of the present invention is illustrated in FIG. 7. This embodiment is the same as the embodiment shown in FIG. 2 except that the positions of the first electrodes 54 and 56 and the second electrode 62 shown in FIG. 2 are rearranged to correspond to positions of first electrodes 74 and 76 and a second electrode 72 shown in FIG. 7, respectively.

As to wiring for power supply to the first electrodes 74 and 76, the electrodes 74 may be connected together at their upper or lower ends, and the electrodes 76 may be connected together at the opposite ends of those of electrodes 74, as described above with reference to electrode 54 and 56 of FIG. 2.

It will be understood by those of ordinary skill in the art that the lenticular unit illustrated in FIG. 7 may be manufactured by a similar manufacturing method described with reference to FIGS. 6A to 6C.

Figure 8:
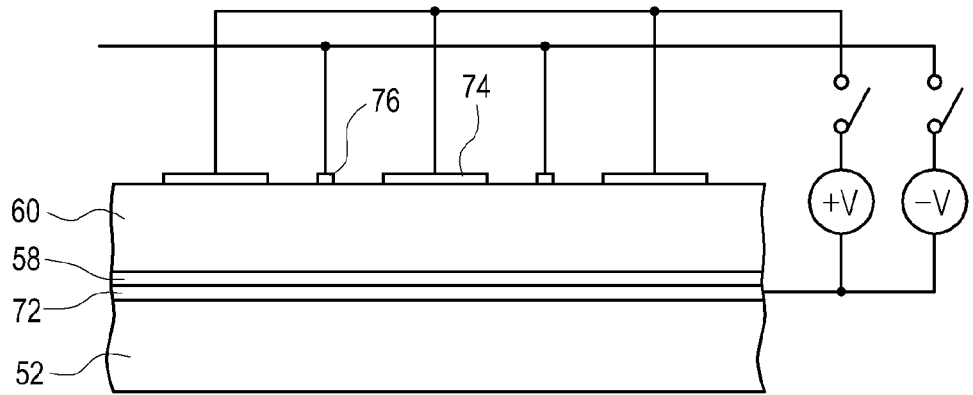
FIG. 8 and FIG. 9 are cross-sectional views illustrating an operation of the 2D/3D-switchable lenticular unit in FIG. 7 according to an exemplary embodiment of the present invention.
Figure 9:
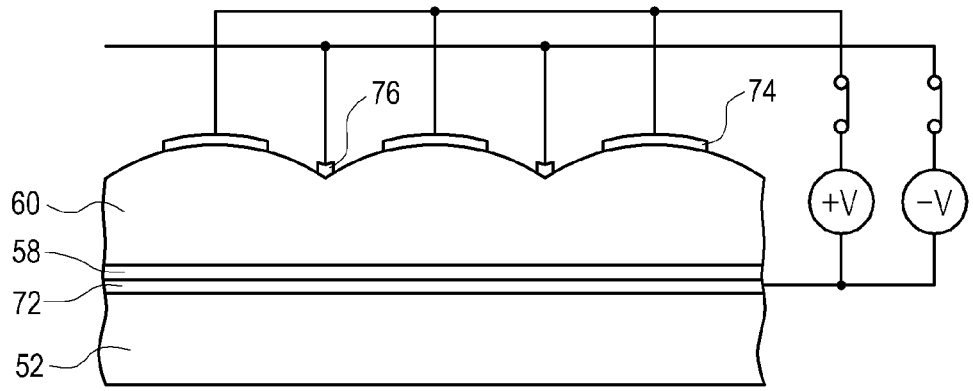

FIGS. 8 and 9 illustrate operations in a 2D display mode and a 3D display mode, respectively, of the lenticular unit of FIG. 7.

The lenticular unit in FIG. 8 may operate as in the 2D display mode described with reference to FIG. 3, since no voltage V is applied.

In order for the lenticular unit to operate in the 3D display mode, a voltage −V may be applied to the electrodes 76 with respect to the common electrode 72, whereas a voltage +V may be applied to the electrodes 74 with respect to the common electrode 72, as shown in FIG. 9. Then, due to the piezoelectric effects, the piezoelectric material under the electrodes 76 contracts in the thickness direction and the piezoelectric material under the electrodes 74 expands in the thickness direction, thereby generating convex-ribbed parallel cylindrical lenses. As a result, the lenticular unit may separate an image from a display unit into a left-eye image and a right-eye image for a viewer, allowing the viewer to enjoy 3D images.

Another exemplary embodiment of the present invention provides lenticular units switchable from a 3D display mode to a 2D display mode.

Figure 10:
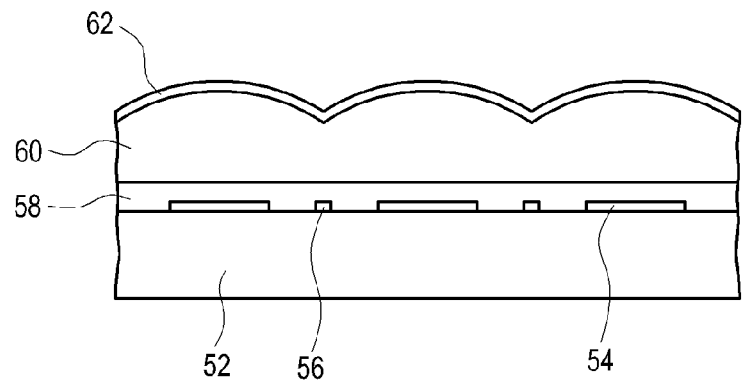
FIG. 10 and FIG. 13 are enlarged cross-sectional views of lenticular units, which are switchable from a 3D display mode to a 2D display mode in reply to an applied voltage, according to an exemplary embodiment of the present invention.
Figure 13:
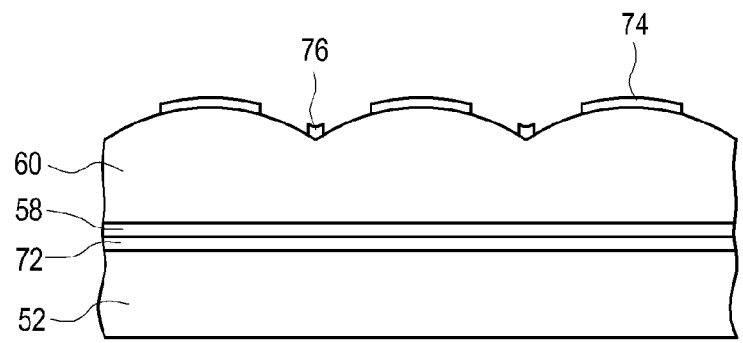

Referring to FIGS. 10 and 13, for 3D display, a deformable material layer 60 includes parallel cylindrical lenses having convex-ribbed profiles. Therefore, the lenticular units illustrated in FIGS. 10 and 13 are for 3D display, but as described below, they may also operate in a 2D display mode. The electrodes 54, 56 and 62 illustrated in FIG. 10, and the electrodes 72, 74 and 76 illustrated in FIG. 13, may be manufactured using the same manufacturing methods as described with reference to FIGS. 6A to 6C, and FIG. 7.

Figure 11:
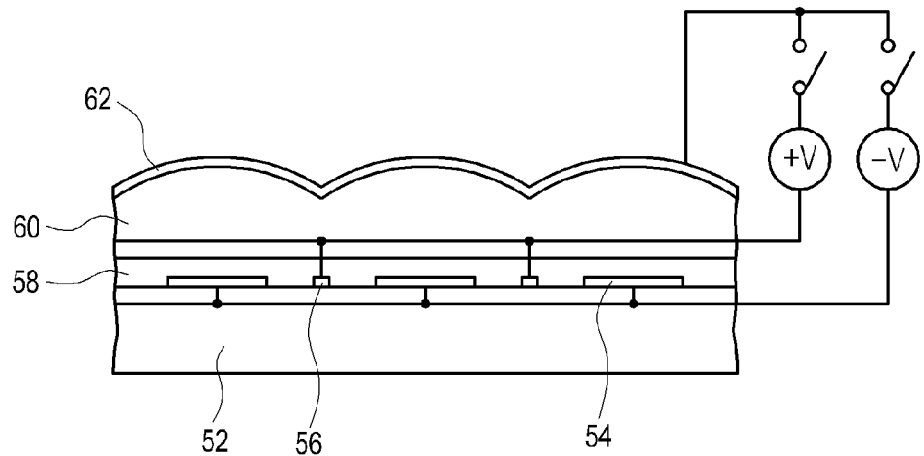
FIGS. 11 and 12, and FIGS. 14 and 15 are cross-sectional views illustrating operations of the lenticular units shown in FIGS. 10 and 13, respectively.
Figure 12:
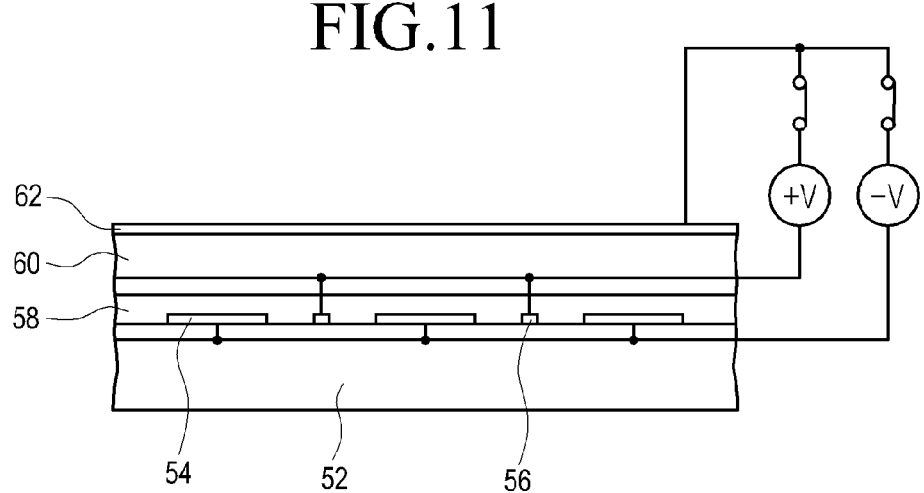

FIG. 11 is a wiring diagram for using the 3D display lenticular unit shown in FIG. 10 as a lenticular unit for 3D display, and FIG. 12 is a wiring diagram for deforming the 3D display lenticular unit shown in FIG. 10 into a lenticular unit for 2D display.

Referring to FIG. 11, no voltages are applied to the first electrodes 54 and 56 and the second electrode 62, so the lenticular unit may operate like the normal lenticular lens sheet. Therefore, the lenticular unit in FIG. 10 may enable auto-stereoscopic 3D display.

Referring to FIG. 12, a voltage −V and a voltage +V, with respect to the common electrode 62, are applied to the electrodes 54 and the electrodes 56, respectively. Due to the supply of the voltages, the material layer 60 on the electrodes 54 contracts in the thickness direction, and the material layer 60 on the electrodes 56 expands in the thickness direction, making the surface of the material layer 60 substantially flat. Therefore, in this case, the lenticular unit may serve as a permeable plate that merely passes 2D images from the display unit.

Referring to FIG. 13, as described above, the lenticular unit in FIG. 13 is the same as that in FIG. 10 except for the placement of the electrodes.

Figure 14:
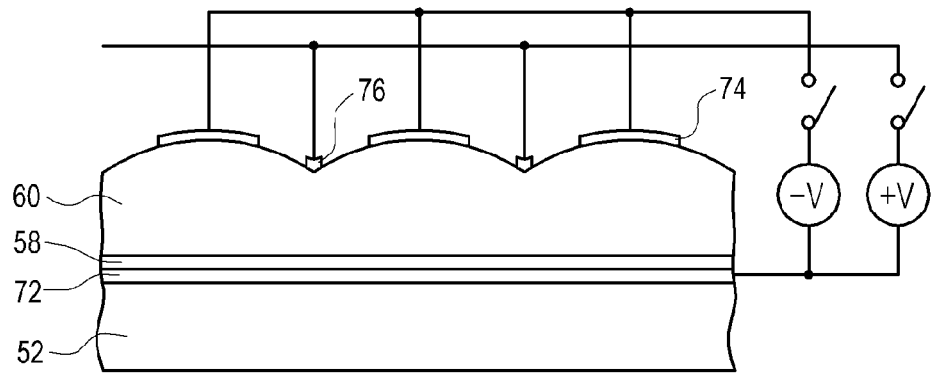

Referring to FIG. 14, as described above, no voltages are applied to the electrodes, for 3D display. In this case, the lenticular unit in FIG. 13 may enable auto-stereoscopic 3D display.

Figure 15:
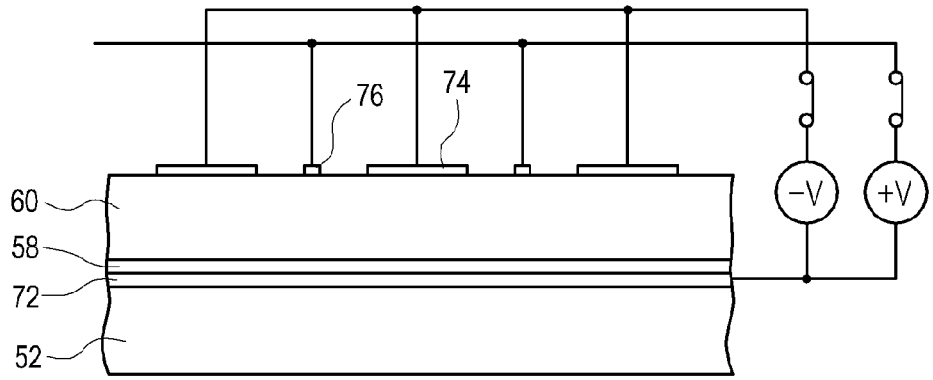

Referring to FIG. 15, a voltage +V and a voltage −V, with respect to the common electrode 72, are applied to the electrodes 76 and the electrodes 74, respectively. Then, the material layer 60 under the electrodes 76 expands in the thickness direction, and the material layer under the electrodes 74 contracts in the thickness direction, making the surface of the material layer 60 substantially flat. Therefore, in this case, the lenticular unit may serve as a permeable plate that merely passes 2D images from the display unit. As a result, the lenticular unit shown in FIG. 13 is switchable from a 3D display mode to a 2D display mode.

As is apparent from the foregoing description, for a lenticular lens sheet, exemplary embodiments of the present invention include an Electro-Active Polymer (EAP) material that can expand and contract according to an applied voltage or potential, making it unnecessary to use the parallel cylindrical lenses molded from polymer materials and having convex-ribbed profiles. For 2D/3D-switchable auto-stereoscopic display, exemplary embodiments of the present invention use, for a lenticular lens sheet, an EAP material that can expand and contract according to an applied voltage or potential, making it unnecessary to use the electro-optical medium. As a result, a 3D auto-stereoscopic display device having a simple structure and manufacturing method, and a lenticular unit or a lenticular lens sheet for a 2D/3D-switchable auto-stereoscopic display device, may be achieved. The above and other aspects, features and advantages may be apparent from the foregoing description.

In the exemplary embodiments described above, voltages of +V and −V are used to create an electric potential across the material layer 60, thereby forming convex-ribbed parallel cylindrical lenses or a substantially flat surface in the material layer 60. A person of ordinary skill in the art can understand that these values are merely an example of voltages that may be used to create an electric potential. For example, it may be possible to achieve the same effects shown in FIGS. 3, 4, 8, 9, 11, 12, 14, and 15 by applying different magnitudes of voltages to the first electrodes 54 and 56 or 74 and 76, or by applying different magnitudes of voltages to the first electrodes 54 and 56 and common electrode 62 or to first electrodes 74 and 76 and common electrode 72 (i.e., the common electrodes 62 and 72 need not be grounded).

A lenticular lens unit according to exemplary embodiments of the present invention may be used with any suitable display device. For example, a lenticular lens unit according to exemplary embodiments of the present invention may be used with a plasma display panel, a liquid crystal display panel, an organic light emitting diode display, an electro-wetting display panel, etc.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A lenticular unit, comprising:
 a transparent substrate;
 first electrodes disposed on the transparent substrate;
 a second electrode,
  the first electrodes being transparent and comprising:
   a positive electrode configured to receive a positive driving voltage with respect to the second electrode for applying an electrical potential to an electro-active polymer;
   a negative electrode configured to receive a negative driving voltage with respect to the second electrode for applying the electrical potential to the electro-active polymer; and
  the second electrode being transparent and having elasticity; and
 a material layer disposed between the first electrodes and the second electrode, the material layer comprising the electro-active polymer material having a piezoelectric effect, the electro-active polymer material being deformable into or from a lens shape in response to the electric potential between the first electrodes and the second electrode,
 wherein the electro-active polymer material corresponding to the positive electrode expands in a thickness direction of the material layer, and the electro-active polymer material corresponding to the negative electrode shrinks in the thickness direction of the material layer according to the piezoelectric effect.

2. The lenticular unit of claim 1, wherein the second electrode comprises a graphene film.

3. The lenticular unit of claim 2, wherein the first electrodes comprise a graphene film.

4. The lenticular unit of claim 3, wherein the electro-active polymer material comprises polyvinylidene fluoride (PVDF).

5. The lenticular unit of claim 4, wherein the lens shape is convex.

6. The lenticular unit of claim 2, wherein the electro-active polymer material comprises polyvinylidene fluoride (PVDF).

7. The lenticular unit of claim 6, wherein the lens shape is convex.

8. The lenticular unit of claim 1, wherein the positive electrode is configured to expand a thickness of the material layer disposed between the positive electrode and the second layer in response to receiving the positive driving voltage with respect to the second electrode, and
 wherein the negative electrode is configured to contract a thickness of the material layer disposed between the negative electrode and the second layer in response to receiving the negative driving voltage with respect to the second electrode.

9. A two-dimensional (2D)/three-dimensional (3D)-switchable auto-stereoscopic display device, comprising:
 a display unit configured to provide an image; and
 a lenticular unit disposed in front of the display unit and comprising:
 a transparent substrate;
  first electrodes disposed on the transparent substrate;
  a second electrode,
   the first electrodes being transparent and comprising:
    a positive electrode configured to receive a positive driving voltage with respect to the second electrode for applying an electrical potential to an electro-active polymer;
    a negative electrode configured to receive a negative driving voltage with respect to the second electrode for applying the electrical potential to the electro-active polymer; and
   the second electrode being transparent and having elasticity; and
  a material layer disposed between the first electrodes and the second electrode, the material layer comprising the electro-active polymer material having a piezoelectric effect, the electro-active polymer material being deformable in response to the electric potential between the first electrodes and the second electrode,
  wherein in one of a 2D display mode and a 3D display mode, no potential is applied between the first electrodes and the second electrode so that the material layer of the lenticular unit is not deformed; and
  wherein in the other of the 2D display mode and the 3D display mode, a potential is applied between the first electrodes and the second electrode so that the material of the lenticular unit is deformed,
  wherein the electro-active polymer material corresponding to the positive electrode expands in a thickness direction of the material layer, and the electro-active polymer material corresponding to the negative electrode shrinks in the thickness direction of the material layer according to the piezoelectric effect.

10. The 2D/3D-switchable auto-stereoscopic display device of claim 9, wherein the second electrode comprises a graphene film.

11. The 2D/3D-switchable auto-stereoscopic display device of claim 10, wherein the first electrodes comprise a graphene film.

12. The 2D/3D-switchable auto-stereoscopic display device of claim 9, wherein the electro-active polymer material comprises polyvinylidene fluoride (PVDF).

13. The 2D/3D-switchable auto-stereoscopic display device of claim 12, wherein the lens shape is convex.

14. A lenticular lens sheet, comprising:
 a transparent substrate;
 first electrodes disposed on the transparent substrate, the first electrodes being transparent;
 a second electrode, the second electrode being transparent and having elasticity, the second electrode comprising:
  a positive electrode configured to receive a positive driving voltage with respect to the second electrode for applying an electrical potential to an electro-active polymer; and
  a negative electrode configured to receive a negative driving voltage with respect to the second electrode for applying the electrical potential to the electro-active polymer; and
 a material layer disposed between the first electrodes and the second electrode, the material layer comprising the electro-active polymer material having a piezoelectric effect, the electro-active polymer material being deformable into or from an array of cylindrical lenses having convex-ribbed profiles in response to the electric potential between the first electrodes and the second electrode, wherein the electro-active polymer material corresponding to the positive electrode expands in a thickness direction of the material layer, and the electro-active polymer material corresponding to the negative electrode shrinks in the thickness direction of the material layer according to the piezoelectric effect.

15. The lenticular lens sheet of claim 14, wherein the electro-active polymer material comprises polyvinylidene fluoride (PVDF).

16. The lenticular lens sheet of claim 15, wherein the second electrode comprises a graphene film, or the first electrodes and the second electrode comprise a grapheme film.

17. The lenticular lens sheet of claim 14, wherein the positive electrode is configured to expand a thickness of the material layer disposed between the positive electrode and the second layer in response to receiving the positive driving voltage with respect to the second electrode, and wherein the negative electrode is configured to contract a thickness of the material layer disposed between the negative electrode and the second layer in response to receiving the negative driving voltage with respect to the second electrode.

18. A method of displaying an image using a display panel and a lenticular unit disposed in front of the display panel, wherein the lenticular unit comprises a first electrode comprising a positive electrode and a negative electrode, a second electrode, and an electro-active polymer material having a piezoelectric effect disposed between the first electrode and the second electrode, the method comprising:

in a first display mode used to display one of a 2D image and a 3D image, not deforming the electro-active polymer material of the lenticular unit through which the displayed image passes; and in a second display mode used to display the other of the 2D image and the 3D image, deforming the electro-active polymer material of the lenticular unit through which the displayed image passes, wherein deforming the electro-active polymer material comprises: applying a positive driving voltage with respect to the second electrode to the positive electrode to expand the electro-active polymer material in a thickness direction; and applying a negative driving voltage with respect to the second electrode to the negative electrode to shrink the electro-active polymer material in a thickness direction, so as to either deform a substantially flat surface of the electro-active polymer material into an array of cylindrical lenses or deform a surface of the electro-active polymer material forming an array of cylindrical lenses into a substantially flat surface.

* * * * *